No. 747,541. PATENTED DEC. 22, 1903.
S. S. EVELAND.
HOLDER FOR USE IN MAKING ISODIAMETRIC BODIES.
APPLICATION FILED DEC. 26, 1901.
NO MODEL.

Witnesses.
Inventor.
Samuel S. Eveland.
By
Augustus B. Stoughton
Attorney.

No. 747,541. Patented December 22, 1903.

UNITED STATES PATENT OFFICE.

SAMUEL S. EVELAND, OF PHILADELPHIA, PENNSYLVANIA.

HOLDER FOR USE IN MAKING ISODIAMETRIC BODIES.

SPECIFICATION forming part of Letters Patent No. 747,541, dated December 22, 1903.

Application filed December 26, 1901. Serial No. 87,295. (No model.)

*To all whom it may concern:*

Be it known that I, SAMUEL S. EVELAND, a citizen of the United States, residing at Philadelphia, in the county of Philadelphia and State of Pennsylvania, have invented a new and useful Holder for Use in Making Isodiametric Bodies, of which the following is a specification.

The principal object of the present invention is to provide a holder through which cylindrical blanks can be fed and by which they can be supported in proper relation to a grinding-surface which brings them to standard sizes within limits expressed by small decimals of an inch.

Another object of the invention is to provide for making the holder adjustable, so as to adapt it for use in connection with different sizes or work.

The invention comprises the improvements hereinafter described and claimed.

The nature, characteristic features, and scope of the invention will be more fully understood from the following description, taken in connection with the accompanying drawings, forming part hereof, and in which—

Figure 1:
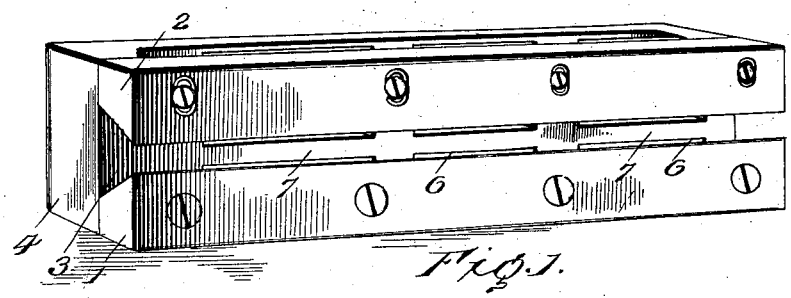
Figure 2:
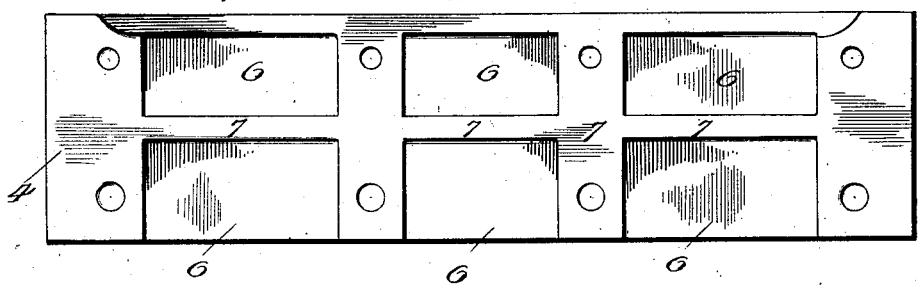
Figure 3:
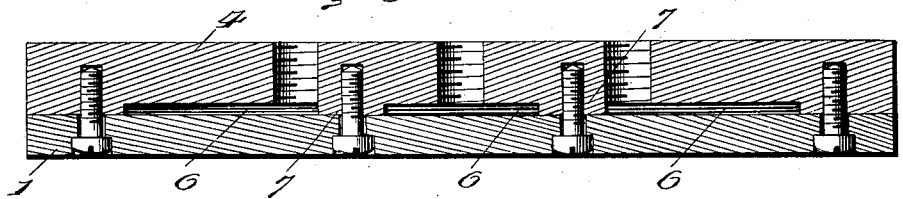
Figure 4:
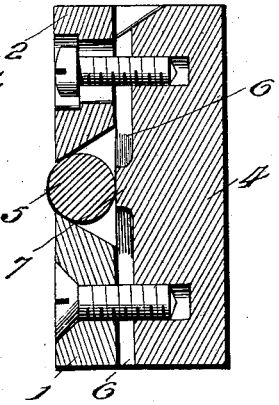

Figure 1 is a perspective view of a holder embodying features of the invention. Fig. 2 is a view of the shank of the holder with the lips removed, and Figs. 3 and 4 are respectively horizontal and vertical sections of the holder.

In the drawings there are shown two lips 1 and 2. However, one of the lips may be omitted; but I believe the best means for practicing the invention comprise two lips.

3 is an opening or notch formed by the shank 4 and the lip or lips. The blank 5 to be operated upon, Fig. 4, is placed in this opening or notch 3, and when so placed it is revolubly supported with a portion of its periphery projecting outward from the face of the holder, so that it can run in contact with a grinding-surface. In that figure the blank is revolubly supported by contact with the shank 4 and with the lip 1 or 2, according as the grinding-surface is assumed to travel either toward the lip 1 or toward the lip 2. The opening or groove 3 is open at each end, so that the blank can be put into the opening 3 from either end of the holder.

The lips 1 and 2 are detachably connected with the shank, so that they can be removed and replaced by thicker or thinner lips in order to coöperate with larger or smaller blanks. Furthermore, the screws which attach one of the lips—for example, lip 2—pass through slots, as shown, and in that way the lip 2 may be adjusted toward and away from the lip 1 to compensate for blanks of different sizes.

The inner face of the shank 4 is shown as cut away at 6. The purpose of this is to facilitate its manufacture, because only the part 7, with which the blank contacts and upon which the lips rest, requires to be finished.

In my application serially numbered 87,296 I have described a machine of which the holder constituting the subject-matter of the present application is a part; but the machine is claimed in that application and is not claimed herein.

It will be obvious to those skilled in the art to which the invention appertains that modifications may be made in details without departing from the spirit thereof. Hence I do not limit myself to the precise construction and arrangement of parts hereinabove set forth and illustrated in the accompanying drawings; but,

Having thus described the nature and objects of the invention, what I claim as new, and desire to secure by Letters Patent, is—

1. A holder for use in making isodiametric bodies which comprises a shank provided with lips which form between them a dovetail-shaped notch that extends across the face of the holder, substantially as described.

2. A holder for use in making isodiametric bodies which comprises a shank cut away, as at 6, and finished, as at 7, and lips connected with the shank and having between them a dovetail-shaped opening or slot, substantially as described.

3. A work-holder comprising a backing-plate having a projecting transverse rib adapted to serve as a rear support for the work and a ledge adapted to serve as a bottom support for the work.

4. A work-holder for use in a grinding-machine comprising a backing-plate having a projecting transverse rib adapted to serve as a rear support for the work, a ledge adapted to serve as a bottom support for the work, and an upper projecting plate adapted to limit the upward movement of the work.

5. A work-holder for use in a grinding-machine, comprising a backing-plate adapted to serve as a rear support for the work, a ledge adapted to serve as a bottom support for the work and an upper plate adjustably secured to the backing-plate adapted to limit the upward movement of the work.

6. A work-holder comprising a backing-plate, having a longitudinal rib thereon and a supporting-plate secured thereto.

7. A work-holder comprising a backing-plate, having a longitudinal rib, a supporting-plate and having passages between said plates.

8. A work-holder comprising a backing-plate, a supporting-plate and an upper guide or guard plate adjustably secured to said backing-plate.

9. A work-holder comprising a backing-plate, a supporting-plate, there being passages between said plates, an upper guide or guard plate there being passages between said backing-plate and said guard-plate.

10. A work-holder comprising a backing-plate, a supporting-plate secured thereto, a guard-plate adjustably secured to said backing-plate, above said plate leaving a longitudinal groove or passage therebetween and openings between said backing-plate and said plates.

In testimony whereof I have hereunto signed my name.

SAMUEL S. EVELAND.

In presence of—
W. J. JACKSON,
JAS. A. RICHMOND.